United States Patent
Ohmiya et al.

(10) Patent No.: US 11,190,666 B2
(45) Date of Patent: Nov. 30, 2021

(54) IMAGE PROCESSING DEVICE, IMAGE FORMING APPARATUS, IMAGE PROCESSING METHOD, AND NON-TRANSITORY COMPUTER-READABLE STORAGE MEDIUM

(71) Applicants: Yutaka Ohmiya, Tokyo (JP); Masamoto Nakazawa, Kanagawa (JP); Tadaaki Oyama, Kanagawa (JP)

(72) Inventors: Yutaka Ohmiya, Tokyo (JP); Masamoto Nakazawa, Kanagawa (JP); Tadaaki Oyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/861,233

(22) Filed: Apr. 29, 2020

(65) Prior Publication Data
US 2020/0412904 A1    Dec. 31, 2020

(30) Foreign Application Priority Data
Jun. 25, 2019  (JP) .............................. JP2019-117673

(51) Int. Cl.
*H04N 1/10*    (2006.01)

(52) U.S. Cl.
CPC .................. *H04N 1/1013* (2013.01)

(58) Field of Classification Search
CPC ......... H04N 2201/327; H04N 1/00132; H04N 1/00135; H04N 1/00188; H04N 2201/3271; H04N 1/00143; H04N 1/00167; H04N 1/32122; H04N 1/32133; H04N 2201/3242; H04N 1/00249; H04N 1/00265; H04N 1/32288; H04N 1/32304; H04N 1/32352; H04N 2201/3205; H04N 2201/3233; H04N 2201/3235; H04N 5/2256; H04N 5/74; H04N 1/00148; H04N 1/00175; H04N 1/32771; H04N 1/32778; H04N 1/407;
(Continued)

(56) References Cited

U.S. PATENT DOCUMENTS 5,440,403 A * 8/1995 Hashimoto .......... H04N 1/3877
358/444
6,094,281 A * 7/2000 Nakai ...................... G07D 7/12
250/208.1
(Continued)

FOREIGN PATENT DOCUMENTS

AU    2003200909 A1    10/2003
JP    2000-322510      11/2000
(Continued)

OTHER PUBLICATIONS

Office Action dated Sep. 22, 2020, in corresponding European Application No. 20173818.4, 8 pages.

*Primary Examiner* — Negussie Worku
(74) *Attorney, Agent, or Firm* — Xsensus LLP

(57) ABSTRACT

An image processing device includes a light source, a reader, and circuitry. The light source is configured to irradiate an object at least with invisible light. The reader is configured to read a first image from the object irradiated with the invisible light. The circuitry is configured to generate a second image from the first image read by the reader. The circuitry is configured to recognize first information in the second image.

16 Claims, 11 Drawing Sheets

(58) Field of Classification Search
CPC ......... H04N 1/6094; H04N 2201/3225; H04N 1/00–00092; H04N 1/032–036; H04N 1/27–31; H04N 1/32144–32352; H04N 1/38–419; H04N 1/46–648; H04N 2201/00–0006; H04N 2201/3269–3271; G06K 15/027–14; G06K 15/1867–225; G06K 2215/0094; G06K 2215/101–111
USPC .......................................................... 358/475
See application file for complete search history.

(56) References Cited

U.S. PATENT DOCUMENTS

| | | | | |
|---|---|---|---|---|
| 6,731,399 | B2 * | 5/2004 | Suzuki | G06K 15/00 358/1.9 |
| 8,873,079 | B2 * | 10/2014 | Iwahashi | G06T 1/00 358/1.13 |
| 9,628,661 | B2 | 4/2017 | Dolev | |
| 2005/0139681 | A1 * | 6/2005 | Premjeyanth | G06K 9/2018 235/468 |
| 2006/0256369 | A1 * | 11/2006 | Mitamura | H04N 1/4433 358/1.15 |
| 2008/0252787 | A1 | 10/2008 | Nakazawa et al. | |
| 2011/0210173 | A1 | 9/2011 | Adams et al. | |
| 2012/0263381 | A1 * | 10/2012 | Yoshida | G06F 3/03545 382/189 |
| 2014/0211273 | A1 | 7/2014 | Konno et al. | |
| 2014/0292202 | A1 * | 10/2014 | Zhang | H05B 45/50 315/127 |
| 2015/0084992 | A1 * | 3/2015 | Wada | G06T 7/80 345/647 |
| 2015/0098117 | A1 | 4/2015 | Marumoto et al. | |
| 2015/0163378 | A1 | 6/2015 | Konno et al. | |
| 2015/0294128 | A1 * | 10/2015 | Kawashima | G06K 7/10722 235/454 |
| 2016/0003673 | A1 | 1/2016 | Hashimoto et al. | |
| 2016/0019407 | A1 * | 1/2016 | Yoshida | G06K 7/1473 235/437 |
| 2017/0295298 | A1 | 10/2017 | Ozaki et al. | |
| 2019/0272423 | A1 * | 9/2019 | Sung | H04N 5/2254 |
| 2019/0327387 | A1 | 10/2019 | Hashimoto et al. | |
| 2019/0335061 | A1 | 10/2019 | Nakazawa et al. | |
| 2020/0053229 | A1 | 2/2020 | Hashimoto et al. | |
| 2020/0053230 | A1 | 2/2020 | Nakazawa et al. | |
| 2020/0053233 | A1 * | 2/2020 | Nakazawa | H04N 1/00241 |
| 2020/0294256 | A1 * | 9/2020 | Nakagawa | G01B 11/245 |

FOREIGN PATENT DOCUMENTS

| | | |
|---|---|---|
| JP | 2010-034807 | 2/2010 |
| JP | 2013-084071 | 5/2013 |
| JP | 2017-046086 | 3/2017 |
| JP | 2017-147498 | 8/2017 |

* cited by examiner

FIG. 7A
FIG. 7B
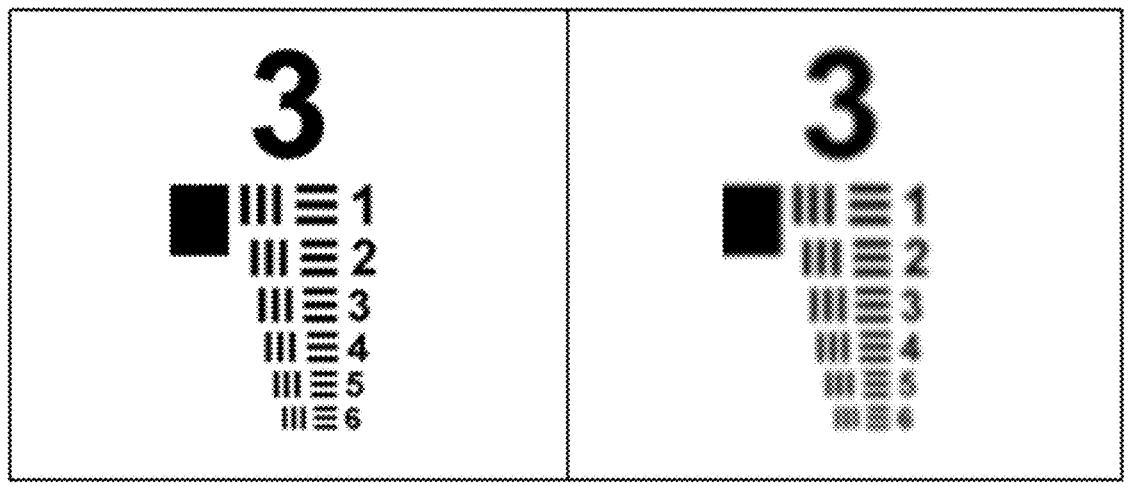
FIG. 8
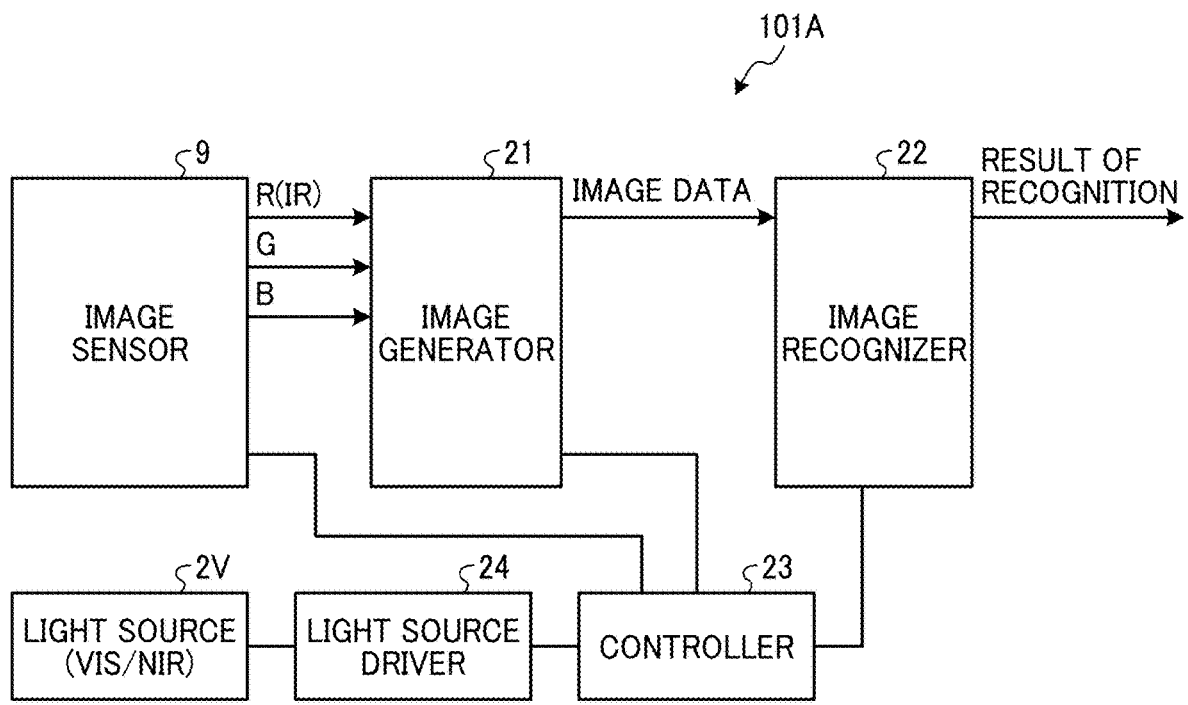

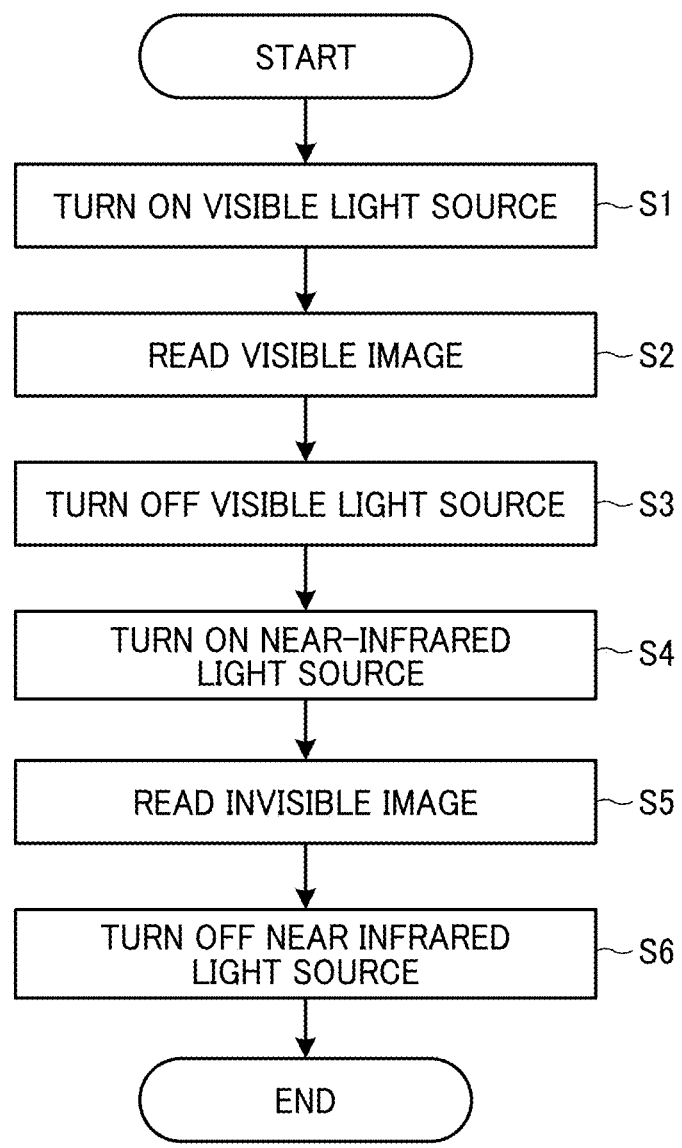

FIG. 11A
1234|
FIG. 11B
FIG. 11C
FIG. 11D
1234

FIG. 14B ¥100,000
~~¥10,000~~

FIG. 14D (CORRECT)

FIG. 14F ¥100,000
~~¥10,000~~ (CORRECT)

FIG. 15A  ABC CORP. 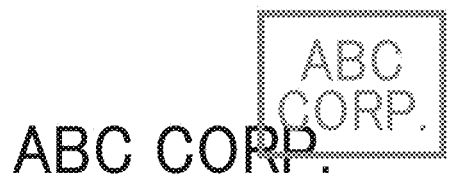
FIG. 15B  ABC CORP.

FIG. 15D  ABC CORP.
FIG. 15E  ABC CORP.
FIG. 15F  ABC CORP.

IMAGE PROCESSING DEVICE, IMAGE FORMING APPARATUS, IMAGE PROCESSING METHOD, AND NON-TRANSITORY COMPUTER-READABLE STORAGE MEDIUM

CROSS-REFERENCE TO RELATED APPLICATION

This patent application is based on and claims priority pursuant to 35 U.S.C. § 119(a) to Japanese Patent Application No. 2019-117673, filed on Jun. 25, 2019, in the Japan Patent Office, the entire disclosure of which is hereby incorporated by reference herein.

BACKGROUND

Technical Field

Embodiments of the present disclosure relate to an image processing device, an image forming apparatus incorporating the image processing device, an image processing method, and a non-transitory computer-readable storage medium storing program code that causes a computer to perform the image processing method.

Related Art

There has been generally known an image processing device that performs optical character recognition (OCR) to recognize a text image included in image data as text. In recent years, there has been a demand for an enhanced OCR to recognize text with an enhanced accuracy.

SUMMARY

In one embodiment of the present disclosure, a novel image processing device includes a light source, a reader, and circuitry. The light source is configured to irradiate an object at least with invisible light. The reader is configured to read a first image from the object irradiated with the invisible light. The circuitry is configured to generate a second image from the first image read by the reader. The circuitry is configured to recognize first information in the second image.

Also described are novel image forming apparatus incorporating the image processing device, image processing method, and non-transitory, computer-readable storage medium storing computer-readable program code that causes a computer to perform the image processing method.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 7A is a diagram illustrating a visible image;

FIG. 7B is a diagram illustrating an invisible image;

FIG. 8 is a block diagram illustrating electric connections of components of an image reader according to a second embodiment of the present disclosure;

FIG. 9 is a schematic flowchart of an image reading process performed by the image reader of FIG. 8;

FIG. 10A is a diagram illustrating a visible image;

FIG. 10B is a diagram illustrating an invisible image;

FIG. 10C is a diagram illustrating a non-common image of the visible image of FIG. 10A and the invisible image of FIG. 10B;

FIG. 10D is a diagram illustrating an AND image of FIG. 10B and FIG. 10C;

FIG. 10E is a diagram illustrating a removal image;

FIG. 10F is a diagram illustrating an image generated by removing the removal image of FIG. 10E from the visible image of FIG. 10A;

FIG. 11A is a diagram illustrating a visible image;

FIG. 11B is a diagram illustrating an invisible image;

FIG. 11C is a diagram illustrating, as a removal image, a common image of the visible image of FIG. 11A and the invisible image of FIG. 11B;

FIG. 11D is a diagram illustrating an image generated by removing the removal image of FIG. 11C from the visible image of FIG. 11A;

FIG. 14B is a diagram illustrating an invisible image;

FIG. 14D is a diagram illustrating a residual image of the non-common image of FIG. 14C;

FIG. 14F is a diagram illustrating an image generated by removing the removal image of FIG. 14E from the visible image of FIG. 14A;

FIG. 15A is a diagram illustrating a visible image of text and an imprint;

FIG. 15B is a diagram illustrating an invisible image of the text and the imprint;

FIG. 15D is a diagram illustrating an invisible image of the text and the background pattern;

FIG. 15E is a diagram illustrating a visible image of the text and a ruled line;

FIG. 15F is a diagram illustrating an invisible image of the text and the ruled line;

Figure 1:
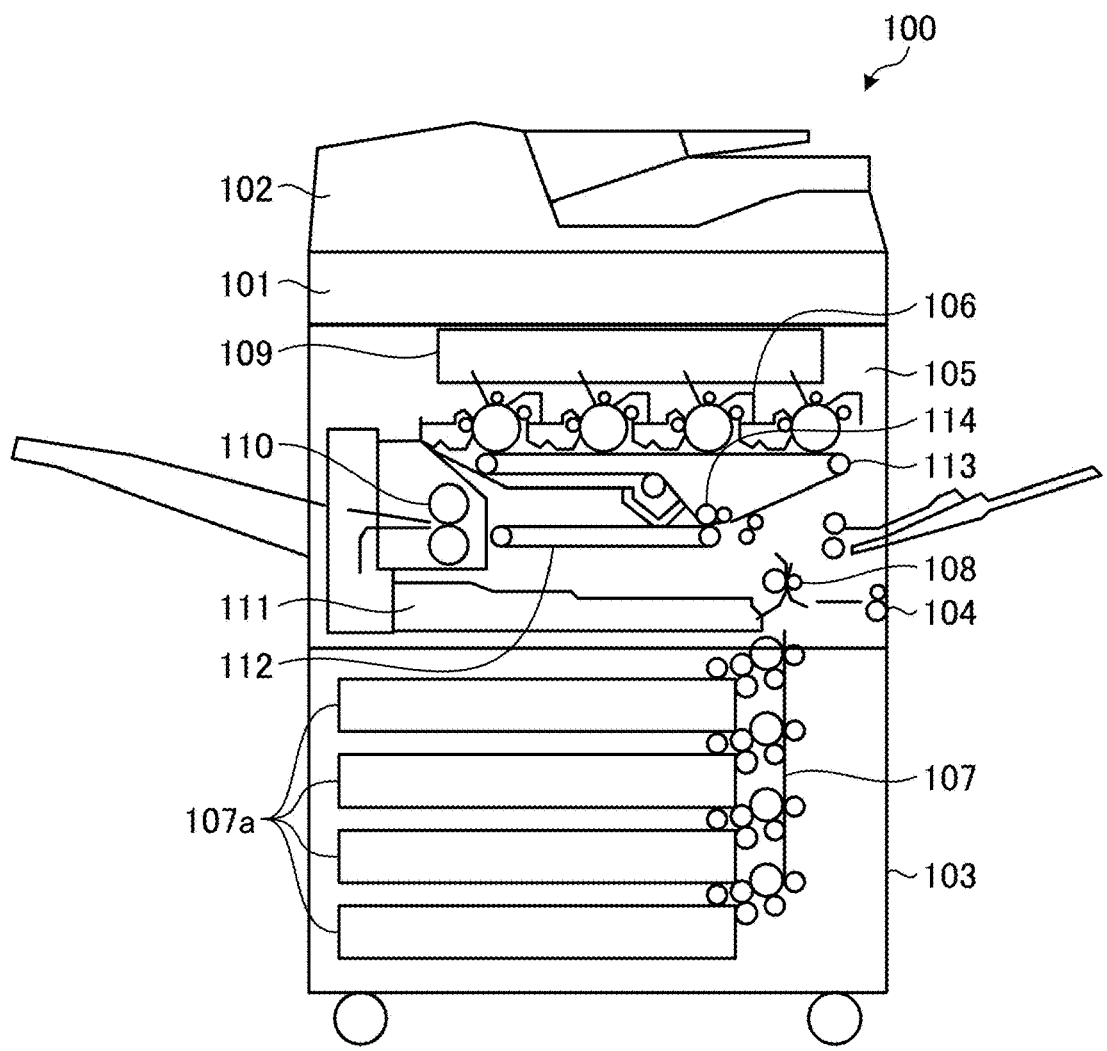
FIG. 1 is a schematic view of an image forming apparatus according to an embodiment of the present disclosure.

The accompanying drawings are intended to depict embodiments of the present disclosure and should not be interpreted to limit the scope thereof. Also, identical or

DETAILED DESCRIPTION

In describing embodiments illustrated in the drawings, specific terminology is employed for the sake of clarity. However, the disclosure of the present specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity, like reference numerals are given to identical or corresponding constituent elements such as parts and materials having the same functions, and redundant descriptions thereof are omitted unless otherwise required.

As used herein, the singular forms "a," "an," and "the" are intended to include the plural forms as well, unless the context clearly indicates otherwise.

It is to be noted that, in the following description, suffixes Y, M, C, and K denote colors of yellow, magenta, cyan, and black, respectively. To simplify the description, these suffixes are omitted unless necessary.

Referring to the drawings, wherein like reference numerals designate identical or corresponding parts throughout the several views, embodiments of the present disclosure are described below.

Initially with reference to FIGS. 1 to 6, a description is given of a first embodiment of the present disclosure.

FIG. 1 is a schematic view of an image forming apparatus 100 according to the first embodiment of the present disclosure.

In FIG. 1, the image forming apparatus 100 is generally called a multifunction peripheral, printer, or product (MFP) having at least two of copying, printing, scanning, and facsimile functions.

The image forming apparatus 100 includes an image reader 101 serving as an image processing device, an automatic document feeder (ADF) 102 atop the image reader 101, and an image forming device 103 below the image reader 101. In order to describe an internal configuration of the image forming device 103, FIG. 1 illustrates the internal configuration of the image forming device 103 from which an external cover is removed.

The ADF 102 is a document supporter that positions, at a reading position, a document or an original including an image to be read. The ADF 102 automatically feeds the document placed on a table to the reading position. The image reader 101 reads the document fed by the ADF 102 at the predetermined reading position. The image reader 101 includes a platen (i.e., exposure glass) as an upper surface of the image reader 101. The platen serves as a document supporter on which a document is placed. The image reader 101 reads the document on the platen, that is, at the reading position. Specifically, the image reader 101 is a scanner that includes a light source, an optical system, and an image sensor such as a charge-coupled device (CCD) inside. In the image reader 101, the light source irradiates the document. Reflected light from the document passes through the optical system and strikes the image sensor, which reads the reflected light. Thus, the image reader 101 reads an image of the document.

The image forming device 103 prints the image of the document read by the image reader 101. The image forming device 103 includes a manual feed roller pair 104 through which a recording medium is manually inserted and a recording medium supplier 107 that supplies a recording medium. The recording medium supplier 107 includes an assembly that sends out recording media one by one from a vertically-aligned input trays 107a. The recording medium thus supplied is sent to a secondary transfer belt 112 via a registration roller pair 108.

A secondary transfer device 114 transfers a toner image from an intermediate transfer belt 113 onto the recording medium conveyed on the secondary transfer belt 112.

The image forming device 103 also includes an optical writing device 109, an image forming unit 105 employing a tandem structure, the intermediate transfer belt 113, and the secondary transfer belt 112. Specifically, in an image forming process, the image forming unit 105 render a latent image written by the optical writing device 109 visible as a toner image and forms the toner image on the intermediate transfer belt 113.

More specifically, the image forming unit 105 includes four rotatable, drum-shaped photoconductors to form yellow, magenta, cyan, and black toner images on the four photoconductors, respectively. Each of the four photoconductors is surrounded by various pieces of image forming equipment 106 including a charging roller, a developing device, a primary transfer roller, a cleaner, and a neutralizer. The pieces of image forming equipment 106 function around each of the four photoconductors to form a toner image on the corresponding photoconductor and transfer the toner image onto the intermediate transfer belt 113. Specifically, the primary transfer rollers transfer the toner images from the respective photoconductors onto the intermediate transfer belt 113. As a consequence, a composite toner image is formed on the intermediate transfer belt 113.

The intermediate transfer belt 113 is entrained around a drive roller and a driven roller and disposed so as to pass through primary transfer nips between the four photoconductors and the respective primary transfer rollers. As the intermediate transfer belt 113 rotates, the composite toner image constructed of the toner images primary-transferred onto the intermediate transfer belt 113 is conveyed to the secondary transfer device 114. The secondary transfer device 114 secondarily transfers the composite toner image onto the recording medium on the secondary transfer belt 112. As the secondary transfer belt 112 rotates, the recording medium is conveyed to a fixing device 110. The fixing device 110 fixes the composite toner image onto the recording medium as a color image. Finally, the recording medium is discharged onto an output tray disposed outside a housing of the image forming apparatus 100. Note that, in a case of duplex printing, a reverse assembly 111 reverses the front and back sides of the recording medium and sends out the recording medium thus reversed onto the secondary transfer belt 112.

Note that the image forming device 103 is not limited to an electrophotographic image forming device that forms an image by electrophotography as described above. Alternatively, the image forming device 103 may be an inkjet image forming apparatus that forms an image in an inkjet printing system.

Figure 2:
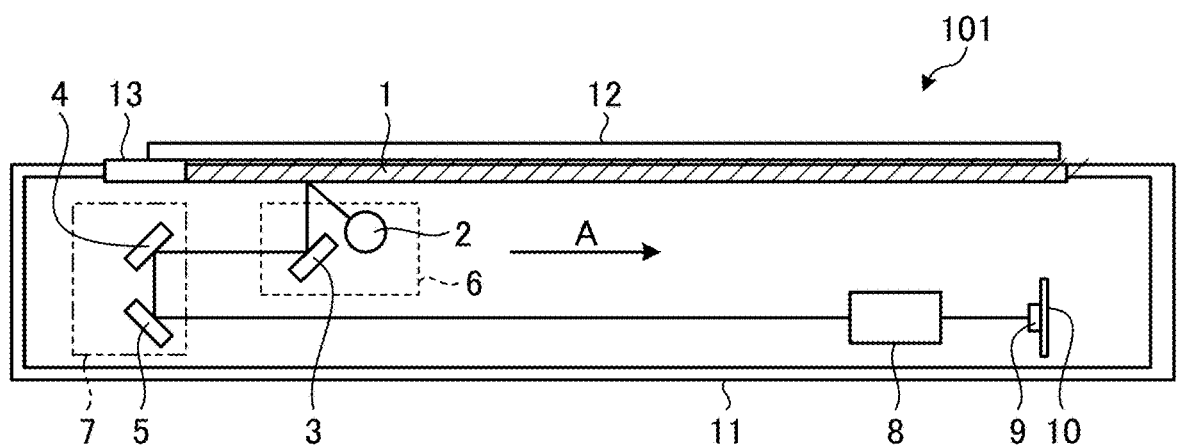
FIG. 2 is a cross-sectional view of an image reader incorporated in the image forming apparatus.
Figure 3:
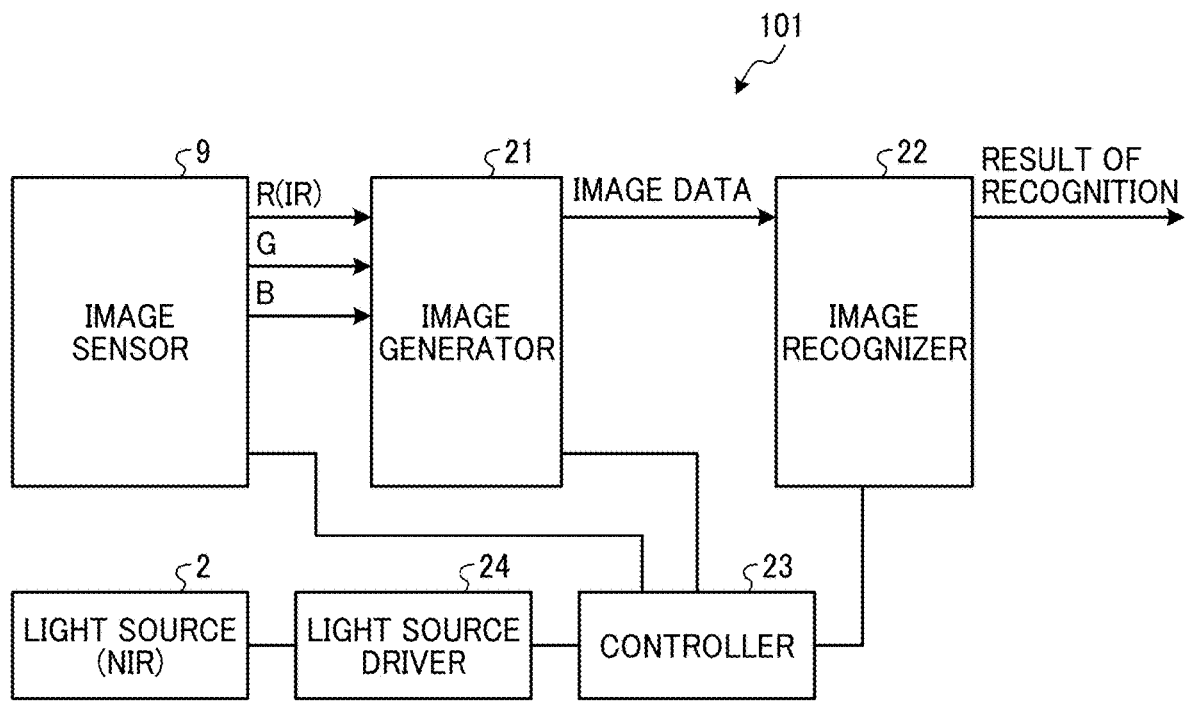
FIG. 3 is a block diagram illustrating electric connections of components of the image reader according to a first embodiment of the present disclosure.

Referring now to FIGS. 2 and 3, a detailed description is given of the image reader 101 described above.

FIG. 2 is a cross-sectional view of the image reader 101 according to the first embodiment of the present disclosure.

As illustrated in FIG. 2, the image reader 101 includes, in a housing 11, a sensor substrate 10 provided with an image sensor 9, a lens unit 8, a first carriage 6, and a second carriage 7. The image sensor 9 serving as a reader is, e.g., a CCD or a complementary metal oxide semiconductor (CMOS) image sensor. The first carriage 6 includes a light source 2 as a light emitting diode (LED) and a mirror 3. The second carriage 7 includes mirrors 4 and 5. The image reader 101 further includes a platen 1 and a reference white plate 13 as an upper surface of the image reader 101.

In a reading operation, the image reader 101 emits light upward from the light source 2 while moving the first carriage 6 and the second carriage 7 from the respective home positions of the first carriage 6 and the second carriage 7 in a sub-scanning direction A. The first carriage 6 and the second carriage 7 causes reflected light from a document 12 to be imaged on the image sensor 9 via the lens unit 8.

When the power is turned on, the image reader 101 reads reflected light from the reference white plate 13 and sets a reference. Specifically, the image reader 101 moves the first carriage 6 directly below the reference white plate 13, turns on the light source 2, and causes the reflected light from the reference white plate 13 to be imaged on the image sensor 9, thereby performing a gain adjustment.

FIG. 3 is a block diagram illustrating electric connections of components of the image reader 101 according to the first embodiment of the present disclosure.

In addition to the image sensor 9 and the light source 2 described above, the image reader 101 includes an image generator 21, an image recognizer 22, a controller 23 serving as a control unit, and a light source driver 24 as illustrated in FIG. 3. The light source 2 of FIG. 3 irradiates an object with invisible light. The image sensor 9 serves as a reader that reads a first image from the object irradiated with the invisible light. The image generator 21 serves as an image generation unit that generates a second image from the first image read by the image sensor 9. The image recognizer 22 serves as an image recognition unit that recognizes first information in the second image. Note that the image generator 21 and the image recognizer 22 may be implemented as at least one of hardware and software.

Specifically, the light source 2 is a near-infrared (NIR) light source that is used to obtain a image in an invisible wavelength range. The light source driver 24 drives the light source 2.

The image sensor 9 images visible and invisible wavelength ranges. The image sensor 9 reads reflected light from an object. In a case in which the image sensor 9 reads a visible image, the image sensor 9 outputs red, green, and blue (RGB) signals. In a case in which the image sensor 9 reads an invisible image, the image sensor 9 outputs an NIR signal. Since a color filter of a general image sensor has a characteristic of transmitting the NIR light, an NIR signal appears at each output of RGB upon reading of an invisible image. In the present embodiment, an NIR signal of an R output is described as a representative of RGB outputs. Note that, in the present embodiment, a visible image refers to an image captured by the image sensor 9 as a result of emission of visible light. By contrast, an invisible image refers to an image captured by the image sensor 9 as a result of emission of invisible light such as the near-infrared light.

In the present embodiment, an invisible wavelength range refers to a near-infrared range of from 800 nm to 1000 nm. However, the invisible wavelength range may include another wavelength range. Since the image sensor 9 is made of a silicon semiconductor and has a sensitivity in the near-infrared range, the near-infrared range assigned as an invisible wavelength range allows a general image sensor to be used as the image sensor 9 to facilitate invisible reading. Therefore, the near-infrared range is desirably assigned as an invisible wavelength range.

The image generator 21 receives a visible RGB image and an invisible infrared (IR) image output from the image sensor 9. The image generator 21 processes the invisible image to generate an image (i.e., image data) for image recognition. The image processing performed by the image generator 21 includes, e.g., resolution adjustment and magnification correction. The image generator 21 outputs the image data thus generated to the image recognizer 22.

The image recognizer 22 receives the image data output from the image generator 21. The image recognizer 22 recognizes specific information and outputs a result of the recognition. The image recognizer 22 of the present embodiment serves as a text recognition unit that recognizes text information. The image recognizer 22 of the present embodiment also functions as a code recognition unit that recognizes code information.

The controller 23 controls the light source driver 24, the image sensor 9, the image generator 21, and the image recognizer 22.

Figure 4:
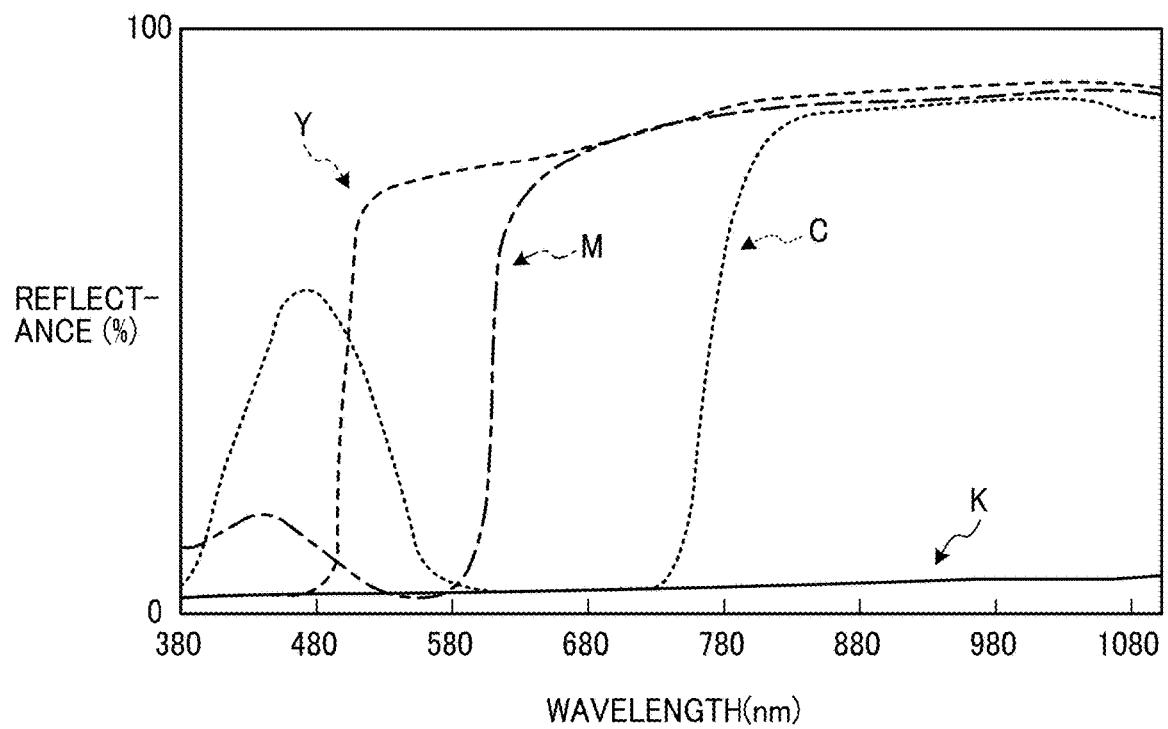
FIG. 4 is a graph illustrating a spectral reflectance when an image is printed on white paper with toner.

FIG. 4 is a graph illustrating a spectral reflectance when an image is printed on white paper with toner.

Specifically, FIG. 4 illustrates a spectral reflectance when, for example, the black, cyan, magenta, and yellow toners used in the image forming device 103 are placed on the black sheet of paper, which exhibits a high reflectance at each wavelength.

In the present embodiment, the visible and invisible images are obtained as different images due to a difference in spectral reflectance when colorants are placed on the black sheet of paper. As illustrated in FIG. 4, a portion printed with the black toner substantially absorbs light in the near-infrared range; whereas portions respectively printed with cyan, magenta, and yellow toners hardly absorb the light in the near-infrared range. That is, since a single image printed with the black toner appears as the invisible image, the visible and invisible images are different from each other. The difference in absorption characteristics in the near-infrared range between the different colorants as illustrated in FIG. 4 is determined by whether the different colorants include carbon black. That is, the different colorants are different from each other as to whether to include carbon black. Therefore, even when an image is printed with colorants other than the toners used in the image forming device 103, different visible and invisible images are obtainable provided that the colorants include a colorant containing the carbon black and a colorant not containing the carbon black. Substantially the same effect is obtainable even when an image is printed with a colorant containing a substance having an absorption characteristic in an invisible range other than the carbon black and a colorant not containing the substance having an absorption characteristic.

Figure 5A:
FIG. 5A is a diagram illustrating a visible text image.
Figure 5B:
FIG. 5B is a diagram illustrating an invisible text image.

Referring now to FIGS. 5A and 5B, a description is given of a difference between a visible text image and an invisible text image.

FIG. 5A is a diagram illustrating a visible text image. FIG. 5B is a diagram illustrating an invisible text image.

In FIGS. 5A and 5B, a text portion is an image printed with black toner; whereas a ruled line is an image printed with cyan, magenta, and yellow toners. Since an image printed with the black, cyan, magenta, and yellow toners appears as a visible image, an image in which the text and the ruled line overlap one another is obtained as illustrated in FIG. 5A. By contrast, since an image printed with the black toner alone appears as an invisible image, a text-only image is obtained as illustrated in FIG. 5B, in which the ruled line does not appear on the image. Note that the image printed with the cyan, magenta, and yellow toners is not limited to the ruled line. Alternatively, the image printed with the cyan, magenta, and yellow toners may be, e.g., a background pattern or an imprint.

The image generator 21 selects an invisible image from the visible image and the invisible image received. The image generator 21 then outputs the selected invisible image to the image recognizer 22.

Typically, the text may be erroneously recognized in the visible image because the text and the ruled line overlap one another. In order to correctly recognize the text, in the present embodiment, the image recognizer 22 serving as a text recognition unit recognizes the text in the invisible image received. Thus, the text is recognized with an enhanced accuracy.

Figure 6A:
FIG. 6A is a diagram illustrating a visible code image.
Figure 6B:
FIG. 6B is a diagram illustrating an invisible code image.

Referring now to FIGS. 6A and 6B, a description is given of a difference between a visible code image and an invisible code image.

FIG. 6A is a diagram illustrating a visible code image. FIG. 6B is a diagram illustrating an invisible code image.

In addition to the text recognition described above, code information such as a barcode or a two-dimensional code may be recognized. The code information is also recognizable with an enhanced accuracy with the configuration described above. In FIGS. 6A and 6B, a two-dimensional code is an image printed with black toner; whereas a ruled line is an image printed with cyan, magenta, and yellow toners. Since an image printed with the black, cyan, magenta, and yellow toners appears as a visible image, an image in which the two-dimensional code and the ruled line overlap one another is obtained as illustrated in FIG. 6A. By contrast, since an image printed with the black toner alone appears as an invisible image, an image with the two-dimensional code alone is obtained as illustrated in FIG. 6B, in which the ruled line does not appear on the image. Note that the image printed with the cyan, magenta, and yellow toners is not limited to the ruled line. Alternatively, the image printed with the cyan, magenta, and yellow toners may be, e.g., a background pattern or an imprint.

The image generator 21 selects an invisible image from the visible image and the invisible image received. The image generator 21 then outputs the selected invisible image to the image recognizer 22.

Typically, the two-dimensional code may be erroneously recognized in the visible image because the two-dimensional code and the ruled line overlap one another. In order to correctly recognize the two-dimensional code, in the present embodiment, the image recognizer 22 serving as a code recognition unit recognizes the code information in the invisible image received. Thus, the code information is recognized with an enhanced accuracy.

According to the present embodiment, the text and the code information are recognized with an enhanced accuracy even in an image that includes a ruled line, a background pattern, and an imprint.

Referring now to FIGS. 7A to 11D, a description is given of a second embodiment of the present disclosure.

Different from the first embodiment in which the text and the code information are recognized by use of an invisible image, the text and the code information are recognized with an enhanced accuracy in a visible image according to the second embodiment. A redundant description of identical features in the first and second embodiments is herein omitted; whereas a description is now given of features of the second embodiment different from the features of the first embodiment.

FIGS. 7A and 7B illustrate an image difference between a visible image and an invisible image due to a difference in modulation transfer function (MTF) characteristic according to the second embodiment. Specifically, FIG. 7A is a diagram illustrating a visible image. FIG. 7B is a diagram illustrating an invisible image.

As illustrated in FIGS. 7A and 7B, generally, an optical characteristic of, e.g., the lens unit 8 of the image reader 101 is optimized in a visible wavelength range. Therefore, the MTF characteristic may deteriorate in the invisible wavelength range, resulting in generation of a blurred image as illustrated in FIG. 7B. A finer image is desirable to recognize the text and the code information with an enhanced accuracy. In other words, a visible image is preferable to an invisible image to recognize the text and the code information with an enhanced accuracy. Therefore, in the present embodiment, the text and the code information are recognized with an enhanced accuracy in a visible image.

FIG. 8 is a block diagram illustrating electric connections of components of an image reader 101A according to the second embodiment of the present disclosure.

As illustrated in FIG. 8, a light source 2V of the image reader 101A of the second embodiment is a visible/NIR light source that includes a visible light source and a near-infrared light source.

The light source 2V irradiates an object with invisible light and visible light. The image sensor 9 serves as a reader that reads a first image and a third image from the object irradiated with the invisible light and the visible light, respectively. The image generator 21 serves as an image generation unit that removes at least part of second information from the third image read by the image sensor 9 to generate the second image. Note that the second information is one of a common portion and a non-common portion of the first image and the third image. Specifically, the image generator 21 has a function of generating an image by removing, from a visible RGB image, one of a common portion and a non-common portion of the visible RGB image and an invisible IR image, and outputting the image (i.e., image data) thus generated. The image generator 21 outputs the image data thus generated to the image recognizer 22.

The image recognizer 22 receives the image data output from the image generator 21. The image recognizer 22 recognizes specific information and outputs a result of the recognition.

Referring now to FIG. 9, a description is given of a flow of an image reading process performed under the control of the controller 23.

FIG. 9 is a schematic flowchart of the image reading process performed by the image reader 101A described above.

As illustrated in FIG. 9, firstly in step S1, the controller 23 causes the light source driver 24 to turn on the visible light source alone of the light source 2V.

In step S2, the controller 23 causes the image sensor 9 to read a visible image.

Subsequently in step S3, the controller 23 causes the light source driver 24 to turn off the visible light source of the light source 2V.

In step S4, the controller 23 causes the light source driver 24 to turn on the near-infrared light source alone of the light source 2V.

In step S5, the controller 23 causes the image sensor 9 to read an invisible image.

Subsequently in step S6, the controller 23 causes the light source driver 24 to turn off the near-infrared light source of the light source 2V.

Thus, the controller 23 completes the image reading process.

Note that, in the above-described flow of the present embodiment, the image sensor 9 reads the visible image first. Alternatively, the image sensor 9 may read the invisible image first.

In a typical removal of a removal target (e.g., a ruled line or a background pattern), part of text might be removed together with the removal target, depending on the way in which the text and the removal target overlap one another. In addition, the part of text that has been removed together with the removal target might fail to be restored, depending on the way in which the text and the removal target overlap one another. Thus, the typical removal often decreases the accuracy of text recognition.

Referring now to FIGS. 10A to 10F, a description is given of a removal of a non-common portion of a visible image and an invisible image by the image generator 21 according to the present embodiment.

FIG. 10A is a diagram illustrating a visible image. FIG. 10B is a diagram illustrating an invisible image. FIG. 10C is a diagram illustrating a non-common image of the visible image of FIG. 10A and the invisible image of FIG. 10B. FIG. 10D is a diagram illustrating an AND image of FIG. 10B and FIG. 10C. FIG. 10E is a diagram illustrating a removal image. FIG. 10F is a diagram illustrating an image generated by removing the removal image of FIG. 10E from the visible image of FIG. 10A.

In FIGS. 10A to 10F, a text portion is an image printed with black toner; whereas a ruled line is an image printed with cyan, magenta, and yellow toners. Since an image printed with the black, cyan, magenta, and yellow toners appears as a visible image, an image in which the text and the ruled line overlap one another is obtained as illustrated in FIG. 10A.

By contrast, since an image printed with the black toner alone appears as an invisible image, a text-only image is obtained as illustrated in FIG. 10B, in which the ruled line does not appear on the image.

That is, in the present example, the text is a common portion of the visible image and the invisible image; whereas the ruled line is a non-common portion of the visible image and the invisible image as illustrated in FIG. 10C.

In order to remove the ruled line without damaging the text image, the image generator 21 first generates the AND image of the invisible image and the non-common image as illustrated in FIG. 10D. Such processing to leave the image of FIG. 10D prevents damage to the text image.

Then, the image generator 21 removes the AND image of FIG. 10D from the ruled line to be removed, that is, the non-common image of FIG. 10C, to generate an image of FIG. 10E as a removal image.

Then, the image generator 21 removes the removal image of FIG. 10E from the visible image of FIG. 10A, to obtain a visible image with the ruled line removed as illustrated in FIG. 10F.

The image recognizer 22 performs image recognition on the visible image illustrated in FIG. 10F. With such a configuration, the image recognizer 22 recognizes the text and the code information in a fine image with the MTF optimized. Thus, the present embodiment enhances the accuracy of recognition.

Referring now to FIGS. 11A to 11D, a description is given of a removal of a common portion of a visible image and an invisible image by the image generator 21 according to the present embodiment.

FIG. 11A is a diagram illustrating a visible image. FIG. 11B is a diagram illustrating an invisible image. FIG. 11C is a diagram illustrating, as a removal image, a common image of the visible image of FIG. 11A and the invisible image of FIG. 11B. FIG. 11D is a diagram illustrating an image generated by removing the removal image of FIG. 11C from the visible image of FIG. 11A.

In FIGS. 11A to 11D, a text portion is an image printed with cyan, magenta, and yellow toners; whereas a broken ruled line is an image printed with black toner. Since an image printed with the black, cyan, magenta, and yellow toners appears as a visible image, an image including the text and the ruled line is obtained as illustrated in FIG. 11A.

When the image recognizer 22 recognizes text in the visible image illustrated in FIG. 11A, a part of the broken ruled line is erroneously recognized as a character because of a relatively short distance between the part of the broken ruled line and a text area. Specifically, the image recognizer 22 may recognize a character string that includes numbers "1234" followed by a number "1" or an alphabet "1". In order to address such a situation, in the present embodiment, the invisible image is used in addition to the visible image to recognize the text with an enhanced accuracy.

By contrast, since an image printed with the black toner alone appears as an invisible image, an image with the ruled line alone is obtained as illustrated in FIG. 11B, in which the text does not appear on the image.

That is, in the present example, the text is a non-common portion of the visible image and the invisible image; whereas the ruled line is a common portion of the visible image and the invisible image as illustrated in FIG. 11C.

Then, the image generator 21 removes the common image of FIG. 11C as a removal image from the visible image of FIG. 11A, to obtain a visible image with the ruled line removed as illustrated in FIG. 11D.

The image recognizer 22 performs image recognition on the visible image illustrated in FIG. 11D. With such a configuration, the image recognizer 22 recognizes the text and the code information in a fine image with the MTF optimized. Thus, the present embodiment enhances the accuracy of recognition.

As described above, according to the present embodiment, the text and the code information are recognized with an enhanced accuracy by removal of information unnecessary for recognition of the text and the code information.

Referring now to FIGS. 12 to 16B, a description is given of a third embodiment of the present disclosure.

Since a visible image is not saved in the first and second embodiments, the first and second embodiments do not satisfy a request for visually recognizing and saving the visible image in addition to a result of the recognition by the image recognizer 22.

To address such a situation, different from the first and second embodiments, the third embodiment enhances the accuracy of recognition of the text and the code information by use of a visible image and an invisible image while saving the visible image. A redundant description of identical features in the first to third embodiments is herein omitted; whereas a description is now given of features of the third embodiment different from the features of the first and second embodiments.

Figure 12:
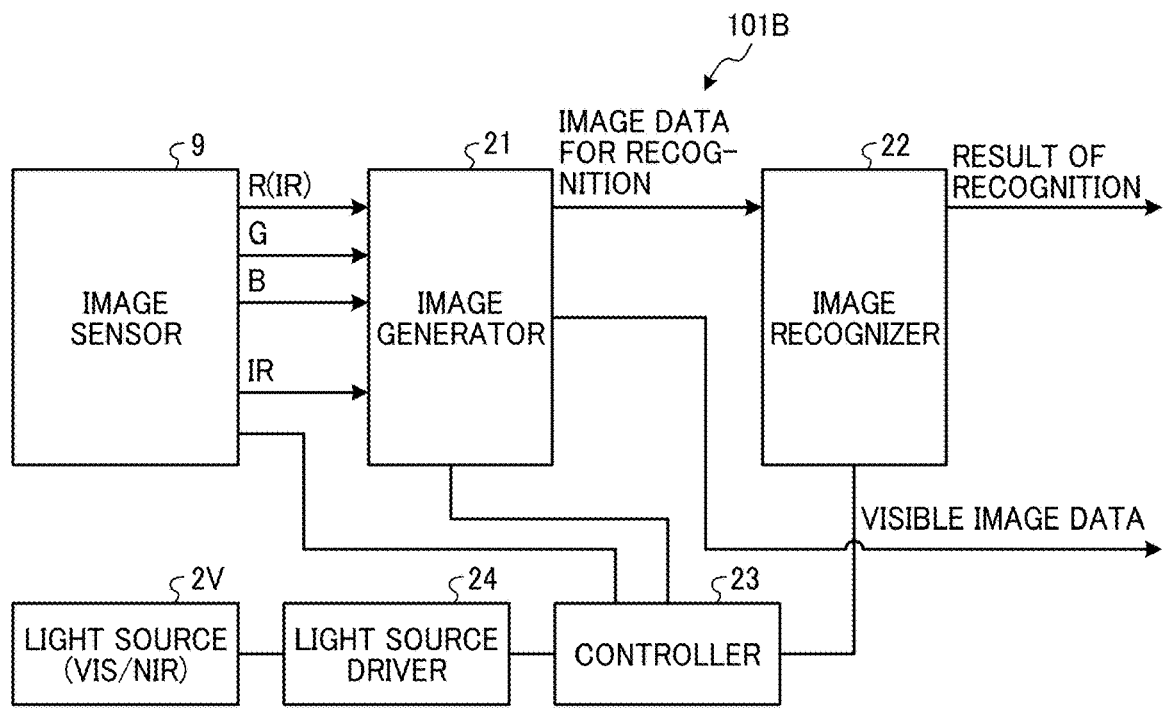
FIG. 12 is a block diagram illustrating electric connections of components of an image reader according to a third embodiment of the present disclosure.

FIG. 12 is a block diagram illustrating electric connections of components of an image reader 101B according to the third embodiment of the present disclosure.

As illustrated in FIG. 12, the light source 2V of the image reader 101B of the third embodiment is a visible/NIR light source that includes a visible light source and a near-infrared light source. The light source 2V is configured to irradiate an object with invisible light and visible light at once. The image sensor 9 serves as a reader that reads a first image and a third image from the object irradiated with the invisible light and the visible light, respectively. In other words, the image sensor 9 has a function of outputting an invisible IR image separately from a visible RGB image.

Such a configuration allows the image reader 101B to acquire the visible image and the invisible image separately from each other even when the visible light source and the near-infrared light source are turned on at once. In short, the image reader 101B obtains both the visible image and the invisible image in a single reading operation. Therefore, the present embodiment allows saving of the visible image that is used by the image recognizer 22 to recognize the text and the code information. In addition, the simultaneous reading of the visible image and the invisible image shortens the time taken for the reading operation.

Figure 13:
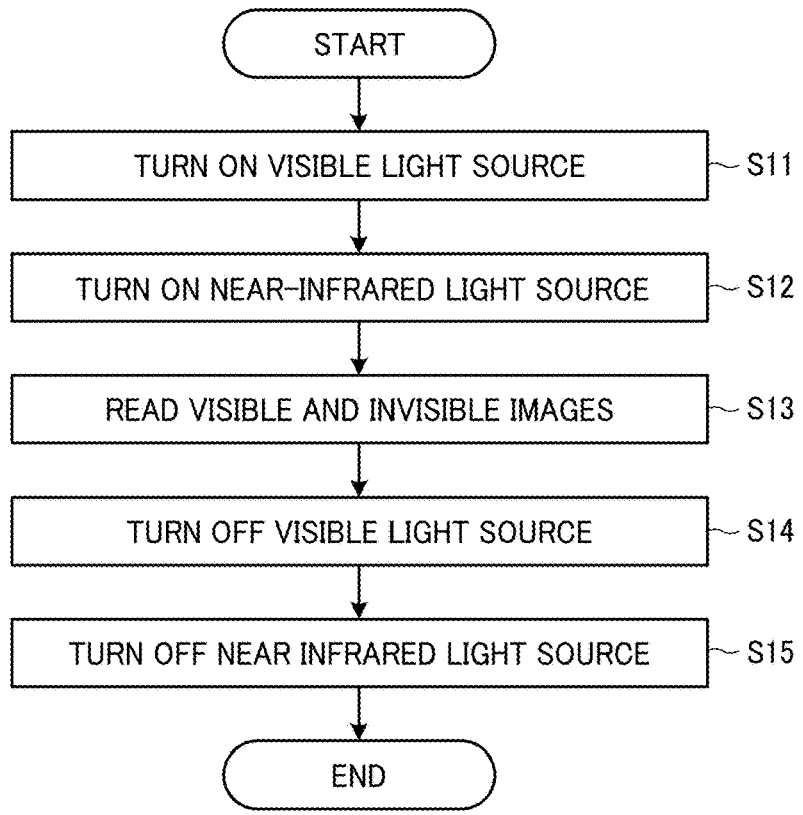
FIG. 13 is a schematic flowchart of an image reading process performed by the image reader of FIG. 12.

Referring now to FIG. 13, a description is given of a flow of an image reading process performed under the control of the controller 23. In the present embodiment, a visible image and an invisible image are obtained at once.

FIG. 13 is a schematic flowchart of the image reading process performed by the image reader 101B described above.

As illustrated in FIG. 13, firstly, the controller 23 causes the light source driver 24 to turn on the visible light source of the light source 2V in step S11 and turn on the near-infrared light source of the light source 2V in step S12.

In step S13, the controller 23 causes the image sensor 9 to read a visible image and an invisible image with both the visible light source and the near-infrared light source turned on.

Subsequently, the controller 23 causes the light source driver 24 to turn off the visible light source of the light source 2V in step S14 and then turn off the near-infrared light source of the light source 2V in step S15.

Thus, the controller 23 completes the image reading process.

Note that, in the above-described flow of the present embodiment, the visible light source is turned on and off before the near-infrared light source. However, the order in which the visible light source and the near-infrared light source are turned on is not limited to the aforementioned order. Similarly, the order in which the visible light source and the near-infrared light source are turned off is not limited to the aforementioned order.

Referring now to FIGS. 14A to 16B, a description is given of some examples of images generated by the image generator 21 according to the present embodiment.

In addition to the function of removing, from a visible image, a common portion or a non-common portion of the visible image and an invisible image, the image generator 21 has a function of leaving, without removing from the visible image, a partial image of the common portion or the non-common portion. That is, the image generator 21 serves as an image generation unit that does not remove third information, as part of the second information, from the third image. As described above, the second information is one of the common portion and the non-common portion of the first image and the third image read by the image sensor 9 from the object irradiated with the invisible light and the visible light, respectively.

Referring now to FIGS. 14A to 14F, a description is given of the function of leaving, without removing from the visible image, the partial image of the common portion or the non-common portion.

Figure 14A:
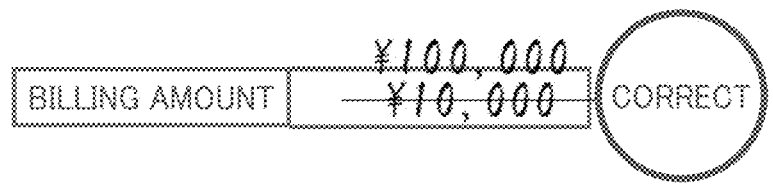
FIG. 14A is a diagram illustrating a visible image.
Figure 14C:
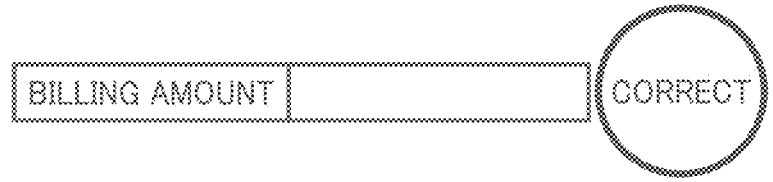
FIG. 14C is a diagram illustrating a non-common image of the visible image of FIG. 14A and the invisible image of FIG. 14B.
Figure 14E:
FIG. 14E is a diagram illustrating a removal image of the non-common image of FIG. 14C.

FIG. 14A is a diagram illustrating a visible image. FIG. 14B is a diagram illustrating an invisible image. FIG. 14C is a diagram illustrating a non-common image of the visible image of FIG. 14A and the invisible image of FIG. 14B. FIG. 14D is a diagram illustrating a residual image of the non-common image of FIG. 14C. FIG. 14E is a diagram illustrating a removal image of the non-common image of FIG. 14C. FIG. 14F is a diagram illustrating an image generated by removing the removal image of FIG. 14E from the visible image of FIG. 14A.

FIGS. 14A to 14F illustrate an example in which the text indicating an amount of money is printed on ruled paper with a correction mark stamped as an imprint. In FIGS. 14A and 14F, the text is printed with a colorant having a characteristic of absorbing the near-infrared light; whereas the ruled line and the imprint are printed with a colorant having a characteristic of not absorbing the near-infrared light.

As illustrated in FIG. 14A, the text, the ruled line, and the imprint appear as the visible image. By contrast, as illustrated in FIG. 14B, the text appears alone as the invisible image.

In a case in which a user requests to visually recognize the text indicating the amount of money and the correction mark stamped on a read image, a removal of the ruled line and the imprint illustrated in FIG. 14C as non-common portions of the visible image and the invisible image as in the second embodiment may hamper the visual recognition of the correction mark on the image data output from the image generator 21.

Since the ruled line and the text are printed overlapping one another, the visible image obtained by the image sensor 9 degrade the visibility of the text.

To address such a situation, the image generator 21 leaves the imprint alone, which is a part of the non-common portion, according to the image that the user wants to visually recognize.

Specifically, the image generator 21 extracts the imprint, which is an image to be left in the non-common portion, according to attributes such as shape and color information, to generate the residual image illustrated in FIG. 14D. Then, the image generator 21 removes the imprint from the non-common portion, to generate the removal image illustrated in FIG. 14E. The removal image illustrated in FIG. 14E is an image to be removed from the visible image. Therefore, the image generator 21 removes the removal image from the visible image.

As a result of the above processing, the image generator 21 generates an image with the text and the imprint appearing alone as illustrated in FIG. 14F, thereby satisfying the request from the user to visually recognize the imprint. At the subsequent stage, the image recognizer 22 performs image recognition on the invisible image, to recognize the text with an enhanced accuracy.

Referring now to FIGS. 15A to 15F, a description is given of an example of a removal image.

Figure 15C:
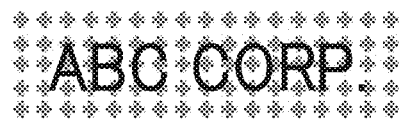
FIG. 15C is a diagram illustrating a visible image of the text and a background pattern.

FIG. 15A is a diagram illustrating a visible image of text and an imprint. FIG. 15B is a diagram illustrating an invisible image of the text and the imprint. FIG. 15C is a diagram illustrating a visible image of the text and a background pattern. FIG. 15D is a diagram illustrating an invisible image of the text and the background pattern. FIG. 15E is a diagram illustrating a visible image of the text and a ruled line. FIG. 15F is a diagram illustrating an invisible image of the text and the ruled line.

Note that, in the images of FIGS. 15A to 15F, the text is printed with a colorant having a characteristic of absorbing the infrared light; whereas the imprint, the background pattern, and the ruled line are printed with a colorant having a characteristic of not absorbing the infrared light.

FIG. 15A illustrates an example in which an imprint is located overlapping the text.

A company seal may be imprinted beside a company name (i.e., text) printed on a slip or the like. In such a case, the text and the imprint may overlap one another. In a case in which the image recognizer 22 uses a visible image to recognize the company name (i.e., text), the image recognizer 22 may erroneously recognize the text because of the common portion (i.e., overlapping portion) of the text and the imprint. To address such a situation, in the present embodiment, the image recognizer 22 uses an invisible image with the text appearing alone as illustrated in FIG. 15B, to recognize the text with an enhanced accuracy.

FIG. 15C illustrates an example in which a background pattern is located overlapping the text.

For a public certificate or the like, a sheet of paper on which a background pattern is printed may be used for the purpose of preventing forgery. In a case in which the image recognizer 22 uses a visible image to recognize a company name (i.e., text) printed on the sheet of paper on which the background pattern is printed, the image recognizer 22 may erroneously recognize the text because of the common portion (i.e., overlapping portion) of the text and the background pattern. To address such a situation, in the present embodiment, the image recognizer 22 uses an invisible image with the text appearing alone as illustrated in FIG. 15D, to recognize the text with an enhanced accuracy.

FIG. 15E illustrates an example in which a ruled line is located overlapping the text.

Ruled paper may be used as a slip or the like. In a case in which the image recognizer 22 uses a visible image to recognize a company name (i.e., text) printed on the ruled paper, the image recognizer 22 may erroneously recognize the text because of the common portion (i.e., overlapping portion) of the text and the ruled line. To address such a situation, in the present embodiment, the image recognizer 22 uses an invisible image with the text appearing alone as illustrated in FIG. 15F, to recognize the text with an enhanced accuracy.

Figure 16A:
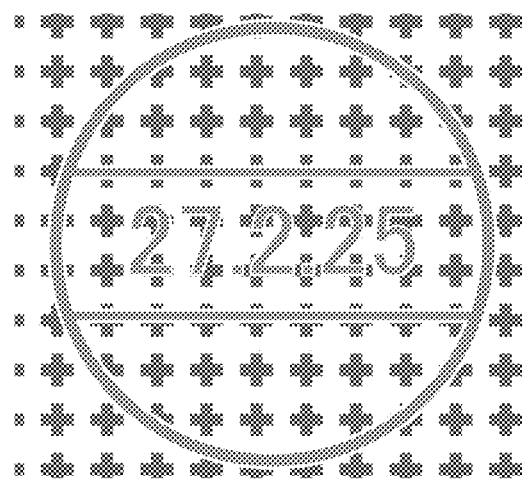
FIG. 16A is a diagram illustrating an achromatic visible image.
Figure 16B:
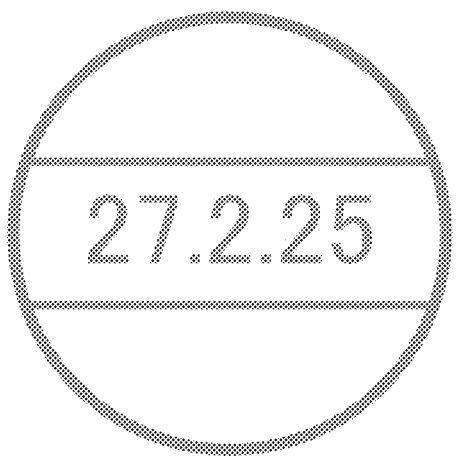
FIG. 16B is a diagram illustrating an achromatic invisible image.

Referring now to FIGS. 16A and 16B, a description is given of an example in which an achromatic image is read visibly and invisibly.

FIG. 16A is a diagram illustrating an achromatic visible image. FIG. 16B is a diagram illustrating an achromatic invisible image.

FIGS. 16A and 16B illustrate an example in which a background pattern is preprinted in an achromatic color and the date of the similar color is stamped on the background pattern. Note that the background pattern is printed with a colorant having a characteristic of not absorbing the near-infrared light; whereas the date is stamped with a colorant having a characteristic of absorbing the near-infrared light.

As described above, in a case in which a difference in density is relatively small between the background pattern and the stamped date due to the fading of ink at the time of stamping under visible light as illustrated in FIG. 16A, the text may be missing because, in the color dropout, the stamped date is determined as not in a stamped color.

To address such a situation, in the present embodiment, an image with the date appearing alone is obtained as an invisible image as illustrated in FIG. 16B due to a difference in absorption characteristics of colorants with regard to a wavelength range of a light source even in a case in which the image is achromatic and has a relatively small difference in density. Thus, the image recognizer 22 recognizes the text with an enhanced accuracy.

Note that in the embodiments described above, the image forming apparatus 100 is described as an MFP having at least two of copying, printing, scanning, and facsimile functions. Alternatively, the image forming apparatus 100 may be, e.g., a copier, a printer, a scanner, or a facsimile machine.

According to the embodiments of the present disclosure, text and code information are recognized with an enhanced accuracy even in an image that includes ruled lines, background patterns, or imprints.

Although the present disclosure makes reference to specific embodiments, it is to be noted that the present disclosure is not limited to the details of the embodiments described above. Thus, various modifications and enhancements are possible in light of the above teachings, without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

Any one of the above-described operations may be performed in various other ways, for example, in an order different from that described above.

Any of the above-described devices or units can be implemented as a hardware apparatus, such as a special-purpose circuit or device, or as a hardware/software combination, such as a processor executing a software program.

Further, each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA) and conventional circuit components arranged to perform the recited functions.

Further, as described above, any one of the above-described and other methods of the present disclosure may be embodied in the form of a computer program stored on any kind of storage medium. Examples of storage media include, but are not limited to, floppy disks, hard disks, optical discs, magneto-optical discs, magnetic tapes, nonvolatile memory cards, read only memories (ROMs), etc.

Alternatively, any one of the above-described and other methods of the present disclosure may be implemented by the ASIC, prepared by interconnecting an appropriate network of conventional component circuits or by a combination thereof with one or more conventional general-purpose microprocessors and/or signal processors programmed accordingly.

What is claimed is:

1. An image processing device comprising:
a light source configured to irradiate an object at least with invisible light, the object including colorants different from each other in spectral reflectance in an invisible spectrum, the light source further configured to irradiate the object further with visible light;
a reader configured to read a first image from the object irradiated with the invisible light, the reader further configured to read a third image from the object irradiated with the visible light; and
circuitry configured to:
generate a second image from the first image and the third image; and
recognize first information in the second image,
wherein the circuitry is further configured to remove at least part of second information from the third image to generate the second image, the second information being one of a common portion and a non-common portion of the first image and the third image.

2. The image processing device according to claim 1, wherein the invisible light is infrared light.

3. The image processing device according to claim 1, wherein the first information is text information.

4. The image processing device according to claim 1, wherein the first information is code information.

5. The image processing device according to claim 1, wherein the light source is configured to irradiate the object with the invisible light and the visible light at a same time.

6. The image processing device according to claim 1, wherein the circuitry is configured not to remove third information, as part of the second information, from the third image.

7. The image processing device according to claim 6, wherein the third information is an imprint.

8. The image processing device according to claim 1, wherein the second information is an imprint.

9. The image processing device according to claim 1, wherein the second information is a background pattern.

10. The image processing device according to claim 1, wherein the second information is a ruled line.

11. The image processing device according to claim 1, wherein at least part of the first information and at least part of the second information are achromatic.

12. The image processing device according to claim 11, wherein the different colorants are different from each other as to whether to include carbon black.

13. An image forming apparatus comprising the image processing device according to claim 1.

14. The image processing device according to claim 1, wherein:
the light source is a single light source which emits both the invisible light and the visible light.

15. An image processing method comprising:
irradiating an object at least with invisible light and visible light, the object including colorants different from each other in spectral reflectance in an invisible spectrum;
reading a first image from the object irradiated with the invisible light, and reading a third image from the object irradiated with the visible light;
generating a second image from the first image and the third image; and
recognizing information in the second image,
wherein the method further comprises removing at least part of second information from the third image to generate the second image, the second information being one of a common portion and a non-common portion of the first image and the third image.

16. A non-transitory, computer-readable storage medium storing computer-readable program code that causes a computer to perform an image processing method, the method comprising:
irradiating an object at least with invisible light and visible light, the object including colorants different from each other in spectral reflectance in an invisible spectrum;
reading a first image from the object irradiated with the invisible light, and reading a third image from the object irradiated with the visible light;
generating a second image from the first image and the third image; and
recognizing information in the second image,
wherein the method further comprises removing at least part of second information from the third image to generate the second image, the second information being one of a common portion and a non-common portion of the first image and the third image.

* * * * *